United States Patent [19]

Constant

[11] Patent Number: 4,707,698

[45] Date of Patent: Nov. 17, 1987

[54] COORDINATE MEASUREMENT AND RADAR DEVICE USING IMAGE SCANNER

[76] Inventor: James N. Constant, 1603 Danbury Dr., Claremont, Calif. 91711

[21] Appl. No.: 182,470

[22] Filed: Aug. 28, 1980

Related U.S. Application Data

[63] Continuation of Ser. No. 40,171, May 18, 1979, abandoned, which is a continuation-in-part of Ser. No. 897,907, Apr. 19, 1978, Pat. No. 4,164,740, which is a continuation of Ser. No. 663,847, Mar. 4, 1976, abandoned.

[51] Int. Cl.$^4$ ............... G01S 13/00; G01C 3/00; G03H 3/00; H04N 13/00
[52] U.S. Cl. ............... 342/179; 342/189; 356/4.5; 356/28.5; 367/8; 358/2; 358/90; 358/109; 358/213.29
[58] Field of Search ........... 343/5 CM, 9 PS; 356/1, 356/28, 28.5, 4.5; 367/8; 358/2, 90, 105, 107, 109, 125, 213; 342/189, 179

[56] References Cited

U.S. PATENT DOCUMENTS

| | | | |
|---|---|---|---|
| 3,284,799 | 11/1966 | Ross | 367/8 |
| 3,622,788 | 11/1971 | Briggs | 358/125 |
| 3,859,518 | 1/1975 | Sander | 358/105 |
| 3,947,630 | 3/1976 | Javan | 358/90 |
| 4,064,533 | 12/1977 | Lampe et al. | 358/105 |
| 4,209,853 | 6/1980 | Hyatt | 367/8 |

OTHER PUBLICATIONS

Amelio, "Charge Coupled Devices", May '74, Scientific American.
Tricoles et al., "Microwave Holography ... ", Proc. IEEE, vol. 65, No. 1, Jan. '77.

Primary Examiner—Stephen C. Buczinski
Attorney, Agent, or Firm—Harris, Kern, Wallen & Tinsley

[57] ABSTRACT

A system for measuring angles, including a lens or antenna for focusing the radiation from an object scene onto an image sensor which is shifted by a clock, thereby producing the real time imaging of the object scene wherein each element of the object scene is detected as a pulse, representing the element angular displacement from the lens, at the output of the image sensor. A system for measuring angles of objects relative to the centerline of a lens or antenna. A goniometer for measuring the bearing of objects. A system for measuring the vector speed of objects. A velocity meter for measuring the speed of objects. A system for tracking objects. A system for motion compensation. A search, track or track-while-scan detection system. Without the lens or antenna, a system for recording and reproducing halograms.

13 Claims, 5 Drawing Figures

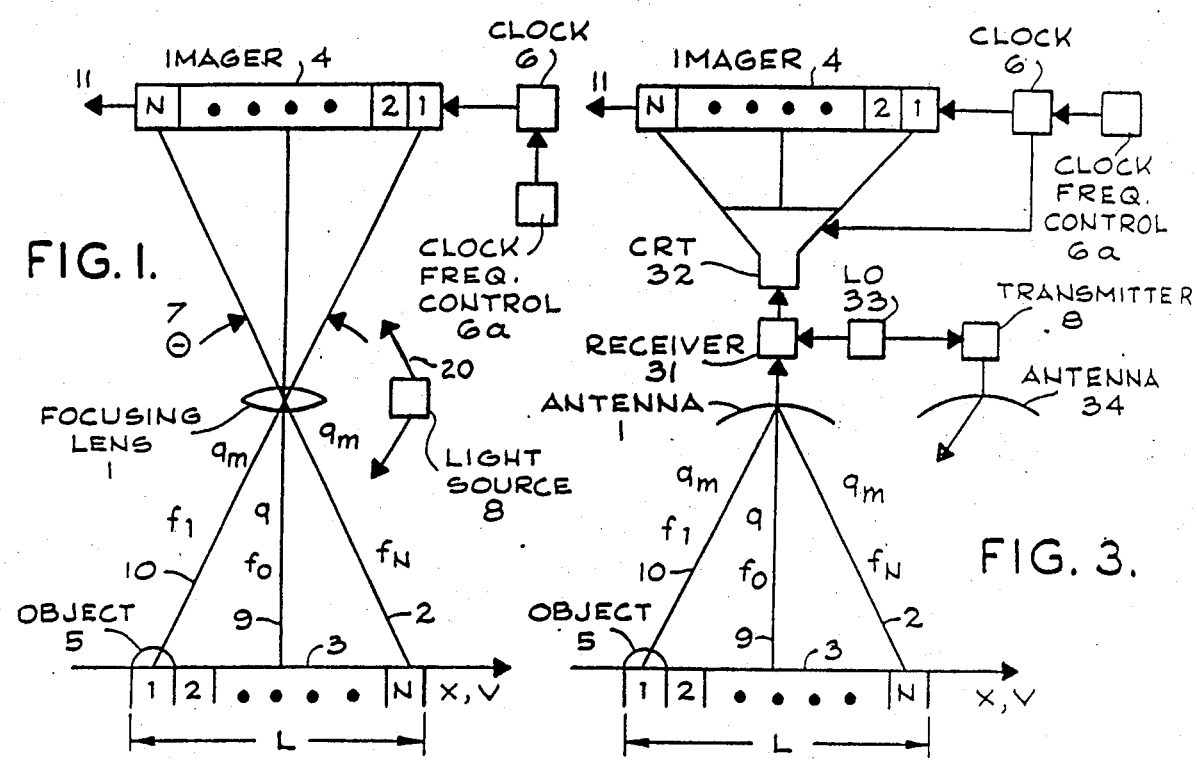
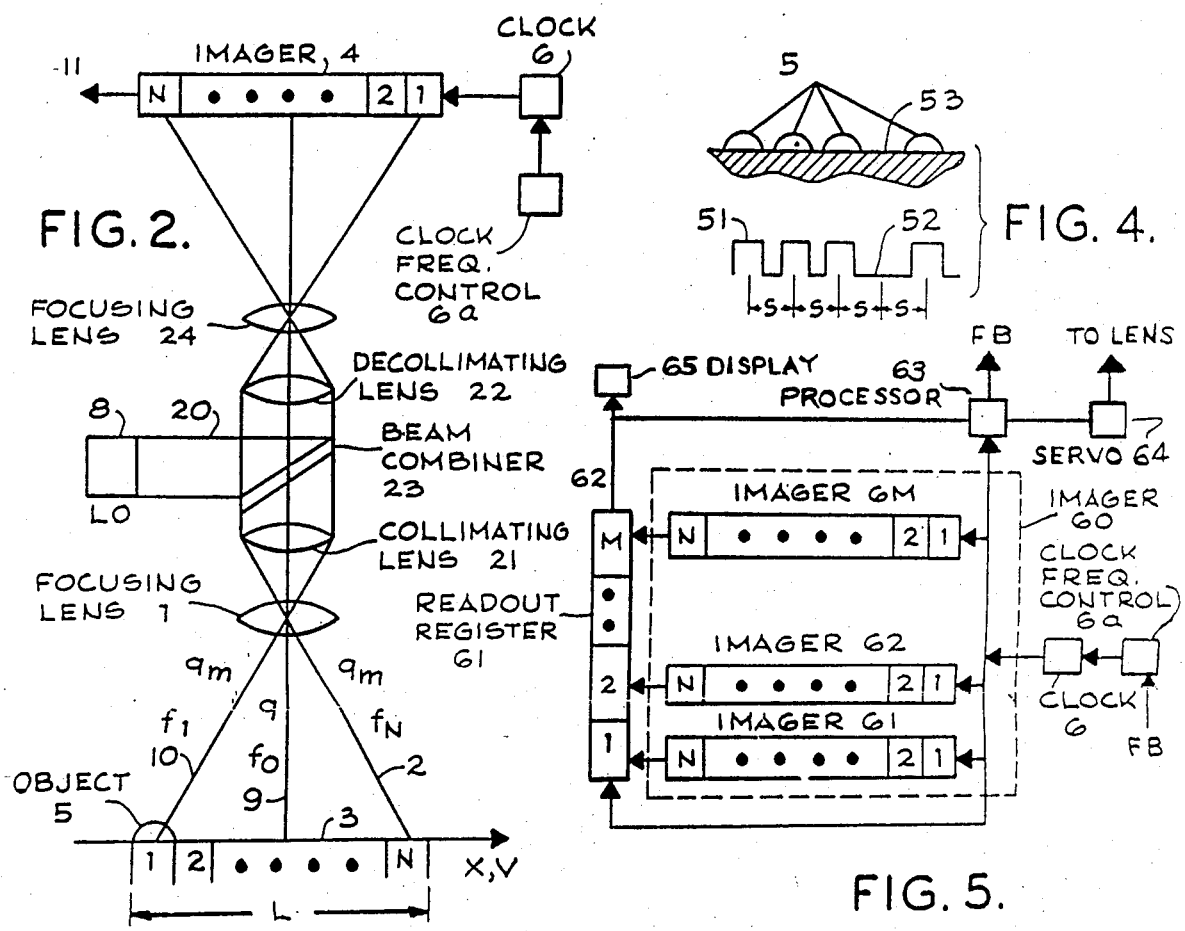

COORDINATE MEASUREMENT AND RADAR DEVICE USING IMAGE SCANNER

CROSS-REFERENCES TO RELATED APPLICATIONS

This is a continuation of application Ser. No. 040,171, filed May 18, 1979, now abandoned, which was a continuation-in-part of application Ser. No. 897,907, filed Apr. 9, 1978, now U.S. Pat. No. 4,164,740, which was a continuation of application Ser. No. 663,847, filed Mar. 4, 1976, now abandoned.

BACKGROUND OF THE INVENTION

Angular measurements can be made by noting the directions of objects relative to a reference direction. It is with respect to the accuracy of the angular measurement wherein the various prior art apparatus differ. Theoretically, the accuracy $\phi$ of angular sighting of objects is determined by the Rayleigh or diffraction limit of a lens, namely $\phi = \lambda/D$, where $\lambda$ is the wavelength and D is the size of aperture. This means that the angular measurement cannot be made better than the limit prescribed by diffraction. Thus, once the wavelength $\lambda$ and aperture size D have been selected, the theoretical accuracy of the angular measurement is known. In practical terms however, the theoretical accuracy of a lens is seldom achieved especially as the wavelength $\lambda$ decreases toward and beyond optical wavelengths. This is due to the fact that small detectors become increasingly size limited at the shorter wavelengths so that putting a detector behind a lens will capture more area than the image area produced by the lens. However, this problem is yielding to recent advances in the art of large scale integration (LSI) which allows the high density packaging of detectors onto a small surface which can then be used to sample the focal plane of a lens. Notable among such recent detectors for its small size and unloading ease is the optoelectric charge coupled image sensor. This sensor has already been put to use in a wide range of imaging applications.

Charge transfer image sensors have been developed using a variety of technologies including solid state (SS), charge coupled devices (CCD), charge injection devices (CID), and bucket brigade devices (BBD). These devices are used to view an object scene or picture and to convert light intensity from the object scene into electrical signals. Transmitted to a remote location, these signals can reproduce an image of the real object scene with high resolution. Linear image sensors consist of a single row of photoelements and, therefore, image a single line of optical information. If a frame, i.e., a number of lines, of optical information is desired either the image or the device must be moved from line to line to obtain the information. Linear image sensors are used in facsimile, slow scan TV, optical character recognition or label reading systems. They also find application in monitoring industrial processors where the processed items are inspected as they pass the linear sensor. Area image sensors, on the other hand, find applications in the imaging of two dimensional object scenes, usually under low light level illuminations and providing compact, light-weight low power-consuming and stable operating long-life camera systems. Area imagers consist of a rectangular array of photoelements. Like the linear devices there are different methods of reading out the stored video information obtained by the photoelements. For example, the information in the photoelements can be read out serially, in serial-parallel, and in parallel formats. Image sensors, their architectures and methods of operation have been described in a number of publications including the article by Amelio "Charge Coupled Devices" appearing in the May, 1974 issue of Scientific American, in the article by Solomon "CCD Image Sensors" appearing in Paper 2 presented at the IEEE Western Electronic Show and Convention (WESCON) Los Angeles, Sept. 10-13, 1974, in the article "A new imaging technology grabs hold: Charge Transfer Devices" appearing in the Mar. 15, 1974 issue of Electronic Design, and in the article by Deliduka "Enormous Bucket-Brigade Optical Scanner Achieves High Efficiency" appearing in the February, 1976 issue of Computer Design. Commercially available image sensors and associated equipment are shown in the brochure of Reticon Corp., entitled Product Summary Solid State Image Sensors and Systems, published in 1973.

Present image sensors work splendidly when the object or view scene is stationary relative to the sensor and even work in a limited respect as the object scene moves across the sensor's field of view at relatively low speed. However, the capability of present image sensors quickly degrades at speeds beginning to approach the modest value of a small fraction of one kilometer per hour. Thus, while the known apparatus and methods of the present image sensors have the ability to form images at stationary and very low speeds they fail at high image speeds. Moreover, there are no known image sensors for measuring angles and speeds much less than for doing so using noncoherent as well as coherent radiations, or for using clock means for signal processing including tracking, or for changing the range focusing of the object scene, or for operating at high rates of motion of the object scene, or for operating at other than optical frequencies.

Present image sensors require that the angular motion of the object be low enough so that the signal being detected does not exceed the response time of the detector. Obviously, there is a trade between a small detector to obtain high angular accuracy and a large detector to obtain useful response when the object moves. This problem is well known in the prior art. Thus, while small size detector arrays are not available these have not been applied to either the angular measurement or the object motion problems, their use being confined to the imaging of stationary or slowly moving objects without angular measurement or motion compensation and to imaging of objects using time delay integration (TDI). Thus, while the known apparatus of the prior art image sensors have the ability to form images at stationary and low object speeds or for using TDI techniques to from images at faster object speeds, they totally fail to provide angular measurements of objects and motion compensation other than TDI. Moreover, there are no known image sensors for measuring angles using noncoherent as well as coherent radiations, or for using clock signals for motion compensation, or for operating at high rates of object motion, or for operating at other than optical frequencies.

Therefore it is an object of the invention to provide apparatus and method for measuring the angles of objects relative to the centerline of a lens or aperture. Another object of the invention is to provide apparatus and method for a goniometer for measuring the bearing of objects. A further object of the invention is to provide apparatus and method for high speed angle measurement in a search, track, or trackwhile-scan detection system.

It is an object of the invention to provide apparatus and method for a velocity meter for measuring the vector speed of objects.

It is another object of the invention to provide apparatus and method for operating using coherent or noncoherent radiation from objects. A further object of the invention is to provide apparatus and method for operating using a stable local oscillator. Another object of the invention is to provide apparatus and method for operating using a synchronous or asynchronous clock.

It is an object of the invention to provide apparatus and method for operating using a clock having error signal inputs for adjusting clock signals. Another object of the invention is to provide apparatus and method for operating using clock signals for object tracking and for motion compensation. A further object of the invention is to provide apparatus and method for operating using a data processor for detecting and correlating pulses from image scanners.

It is another object of the invention to provide apparatus and method for operating using a data processor for generating error signals used for tracking objects and for motion compensation. Another object of the invention is to provide apparatus and method for recording and reproducing holograms. Another object of the invention is to provide apparatus and method for operating using an output display. Yet another object of the invention is to provide apparatus and method for operating at acoustical, microwave, infra-red, and optical wavelengths.

SUMMARY OF THE INVENTION

In accordance with a principle of this invention an apparatus for measuring the angles of objects relative to the centerline of a lens or antenna in real time using an image sensor is provided. The apparatus comprises a focusing lens or antenna of acoustical or electromagnetic energy for forming a receiving beam, an image sensor with a plurality of photoelements for detecting signals from the lens, and a clock for shifting the image sensor contents. An object in the receiving beam at a given angle to the lens centerline is detected by a photoelement or photoelements of the image sensor. The image sensor is scanned synchronously or asynchronously by the clock to provide detections of objects at different angles by the individual photoelements. Pulses appear at the output of the image sensor with a pulse for each object representing the angle of the object relative to the centerline of the lens or antenna.

In accordance with another principle of this invention, the apparatus may include means for high speed angle measurement in a search, track, or track-while-scan detection system.

In accordance with another principle of the invention, the apparatus may include means for a velocity meter for measuring the vector speed of objects.

In accordance with another principle of this invention, the apparaus may include means for operating using coherent or noncoherent radiation from objects.

In accordance with another principle of the invention, the apparatus may include a stable local oscillator for referencing signals.

In accordance with another principle of the invention, the apparatus may include a synchronous or asynchronous clock.

In accordance with another principle of the invention, the apparatus may include clock means having error signal inputs for adjusting clock signals.

In accordance with another principle of the invention, the apparatus may include clock means for object tracking and for motion compensation.

In accordance with another principle of the invention, the apparatus may include a data processor for detecting and correlating pulses from image scanners.

In accordance with another object of the invention, the apparatus may include a data processor for generating error signals used for tracking objects and for motion compensation.

In accordance with another object of the invention, the apparatus may include a data processor for viewing the images of an object scene.

In accordance with yet another object of the invention, the apparatus may include transmitter means for operating at acoustical, microwave, infra-red, and optical wavelengths.

In accordance with another object of the invention, the apparatus without lens or antenna may be used to record and reproduce holograms.

In accordance with another principle of this invention, a method for measuring the angles of objects relative to a lens or antenna in real time using an image sensor is provided. The method comprises the steps of focusing an object scene through a lens or antenna of acoustical or electromagnetic energy forming a receiving beam onto an image sensor with a plurality of photoelements, detecting signals from objects in the object scene in the photoelements, shifting the contents of the photoelements in the image sensor to its output, and determining angles of objects from pulses at the image sensor output with a pulse for each object representing the angle of the object relative to the centerline of the lens or antenna.

In accordance with another principle of this invention, the method also includes the step of searching, tracking, or tracking while scanning to obtain high speed angle measurements of objects.

In accordance with another principle of this invention, the method also includes the step of measuring the vector speed of objects.

In accordance with another principle of the invention, the method includes the step of operating using coherent or noncoherent radiation from objects.

In accordance with another principle of the invention, the method includes the step of generating a stable local frequency for referencing signals.

In accordance with another principle of the invention, the method includes the step of synchronously or asynchronously scanning the imager.

In accordance with another principle of the invention, the method includes the step of generating error signals for adjusting clock signals.

In accordance with another principle of the invention, the method includes the step of adjusting clock signals for object tracking and motion compensation.

In accordance with another principle of the invention, the method includes the steps of detecting and correlating pulses from image scanners.

In accordance with another principle of the invention, the method includes the step of generating error signals used for tracking objects and for motion compensation.

In accordance with another principle of the invention, the method includes the step of viewing images of an object scene.

In accordance with yet another principle of the invention, the method includes the step of operating at acoustical, microwave, infra-red, and optical wavelengths.

In accordance with another principle of the invention, the method without lens or antenna may be used to record and reproduce holograms.

It will be appreciated from the foregoing description that the invention provides appartus and method for measuring angles or objects from the centerline of a lens or antenna, for measuring the vector speed of objects for tracking or motion compensation of objects. The apparatus comprises an image sensor which detects signals from objects through a lens or antenna forming a receiving beam which connects the image sensor and objects being viewed in an object or view scene in a space link with clock means for shifting the contents of photoelements in the image sensor to its output and for motion compensation.

Without the lens or antenna, the invention provides apparatus for recording and reproducing holograms.

The method is equally uncomplicated and comprises the steps of focusing an object scene through a lens onto an image sensor, detecting signals from objects in the image sensor, shifting the image sensor to obtain its outputs and using the detected outputs from the image sensor to measure angles, speed, tracking and motion compensation of objects.

Without the lens, the invention provides method for recording and reproducing holograms.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 1 is a schematic diagram which illustrates an optical embodiment of the invention using a linear imaging sensor;

FIG. 2 is a schematic diagram of a beam combiner which can be used to operate the system of FIG. 1 as a coherent system;

FIG. 3 is a schematic diagram which illustrates one of a microwave or acoustical embodiment of the invention using a linear imaging sensor;

FIG. 4 is a time plot which illustrates the relationships existing between objects and pulses which appear at the output of the image sensor of FIGS. 1, 2 and 3, and FIG. 5 is a schematic diagram which illustrates an embodiment of the image sensor of FIGS. 1, 2 and 3 as an area image sensor.

DESCRIPTION OF THE PREFERRED EMBODIMENTS

FIG. 1 illustrates a focusing lens 1 forming a receiving beam 2 for viewing an object scene 3 spanning the distance L at the range q from lens 1. Lens 1 focuses object scene 3 upon image sensor 4 shown as a linear image sensor having N photoelements. An object 5 occupies one of the N positions in object scene 3 and is detected by the corresponding one of the N photoelements in imager 4. A clock 6 is used to shift detected signals by photoelements in imager 4 to its output 11. The transfer of detected electrons in a given photoelement to the output 11 of imager 4 can be made through other photoelements or directly from the photoelement to output 11. The geometry between lens 1 and imager 4 is known so that outputing charges from a given photoelement provides a pulse at output 11 with a pulse for each object 5 representing the angular direction of object 5 from the lens centerline.

Focusing lens 1, imager 4 and clock 6 are found in conventional image sensors and may be any of the well known units. The lens or antenna may be an antenna type structure used at acoustical frequencies or used at microwave or millimeter frequencies or may be a lens type device used at infrared and optical frequencies. The lens or antenna has a beam width $\theta$ 7 and may be scanned by conventional techniques if desired, although this type scanning is not central to the invention. Imager 4 may be a millimeter, infrared or optical imager in which case it may require replacing photoelements by the combination of a detector, input circuit, and charge coupled device (CCD), for example as shown in FIGS. 61 and 62 in the article by D. Barbe "Imaging devices using the charge coupled concept" appearing in the January 1975 issue of the IEEE Proceedings. In some applications a light source or transmitter 8 may be used to illuminate object scene 3. Light source 8 may be coherent or incoherent as desired.

It will be appreciated by those skilled in the art that the system of FIG. 1 will measure the angular direction of object 5 from the lens 1 centerline 9 in accordance with the system of the invention. This is done by calibrating the distance from each photoelement of imager 4 to centerline 9 so that the pulse at output 11 from each photoelement represents angular direction of its object 5 from centerline 9. Normally, each photoelement in imager 4 detects a charge due to object 5 which is proportional to the amount of photons of the incident light. This corresponds to both the brightness of the light and the illumination or shine time, i.e., the time object 5 illuminates the instant photoelement. As long as the accumulating charge does not saturate the photoelement it represents integrated charge over the shine time. Although it is sufficient to operate the system in this manner, this process is an incoherent one which inherently neglects the phase of the signal, especially when the light from object 5 is itself coherent, in which case of coherent signals it is possible to operate the system coherently. To preserve the signal phase it is necessary to have coherent signals from object 5, for example having a laser transmitter 8 for illuminating object 5 and illuminating imager 4 with a reference beam from coherent transmitter 8 or from a separate coherent source or from a stable local oscillator. Thus, light source 8 may illuminate image 4 directly to provide a reference beam of coherent or incoherent energy.

Without lens 1, light source 8 may illuminate imager 4 directly and also indirectly by reflecting energy from objects 5 and thereby for providing the reference and signal beams of a holographic device which, except for the use of imager 4, is otherwise conventional. Means for implementing the reference and signal beams for a variety of holographic devices are well known and these all may be used by the invention except that the invention replaces the film of the conventional devices by imager 4.

FIG. 2 shows, by way of example, how a reference beam 20 from a transmitting or stable local oscillator 8 can be combined with signal beam 2. This is done by inserting a collimating lens 21, decollimating lens 22, beam combiner 23 and focusing lens 24 between focusing lens 1 and image sensor 4. The result is that reference beam 20 combines with signal beam 2 in beam combiner 23 and both beams illuminate imager 4. As before, each photoelement of imager 4 detects the signal from object 5 excepting now the detected signals are coherent resulting from the radiation beam 2 and reference beam 20 so that the phase of the signal now determines the charge in each photosensor. For example, the variation of the signal phase from element to element in imager 3 when the view scene 4 is stationary depends on the distance to objects 5. When the view scene 3 is moving the doppler frequency also determines phase. In any case, the charge in each photoelement is greatest for those elements wherein the signal and reference beams are in phase and least for those elements wherein these are out of phase. It should be noted that light source 8 (FIG. 1) and local oscillator 8 (FIG. 2) may be one and the same or separate units as desired.

FIG. 3 illustrates a receiving antenna 1 forming a receiving beam 2 for viewing an object scene 3 spanning the distance L at range q. The radiation is detected by a receiver 31 through antenna 1. The output of the receiver is used to intensity modulate a cathode ray tube 32 whose output illuminates imager 4. A clock 6 is used to shift detected signals in imager 4 to its output 11 and also to synchronize the scanning of cathode ray tube 32 and, in some applications, of antenna 1. In some applications a transmitter 8 may be used to illuminate object scene 3. Transmitter 8 may be coherent or incoherent and may operate at acoustical or microwave frequencies as desired. It should be understood that although the system of FIG. 3 is shown using dual antennas for transmissions and receptions, the system can be implemented using a common antenna equally well, In other applications, a stable local oscillator 33 may be used as a common reference source for both the transmitter 8 and receiver 31, i.e., the radar may be coherent.

It will be recognized by those skilled in the art that the system of FIG. 3 is that of a conventional radar combined with the invention imager 4 and clock 6. Any of the well known conventional elements of radars may, therefore, be utilized to implement the radar portion of the system of FIG. 3. Except for its operation at acoustical or microwave frequencies, the system of FIG. 3 operates in the same manner of the optical systems of FIGS. 1 and 2, i.e., as either a coherent or incoherent system.

The detected signals from objects 5 which appear in photoelements of imager 4 follow paths 10, 9, 2 shown traced through lens or antenna 1 and eventually falling on imager 4. The signals in paths 10, 9, 2 are characterized as each having the same coherent frequency when the object 5 itself is a coherent source or each having the same spectral distribution when the object 5 itself is an incoherent source. Thus signals, whether these be coherent or not, which appear in photoelements of imager 4 all have a carrier or center frequency $f_o$. The photosensing of signals is accomplished in the individual photoelements of imager 4 and object 5 at location 1 of object scene 3 is detected by photoelement 1 in imager 4 and so forth and the individual detections of objects 5 by individual photoelements are shifted to the output of imager 4 using clock means 6. In many applications, a transmitting or stable local oscillators 8, 33 may be used to provide a stable reference, intermediate frequency (IF) operation or as a local oscillator in a heterodyne receiver, or to provide active transmissions, or as one means of obtaining target range, range resolution, and two dimensional scanning of object scene 3. Any of the well known types of transmitting or stable local oscillators 8, 33 may be utilized to implement the invention.

FIG. 4 illustrates the correspondence between closely spaced objects 5 in beam 2 and their corresponding output pulses 51 at the output 11 of imager 4. A single pulse 51 appears at the output 11 of imager 4 for each object 5 for each frame of data cycled from imager 4 to output 11 by clock 6. No pulses 52 appear when objects 5 are missing from a given location 53. The pulses 51 are separated by the distances s which are determined by the resolving power of the system. The height of pulses 51 is determined by the contrast of objects 5 when seen in the background of object scene 3 and by the processing gain in imager 4, for example by the number of photoelements used for time delay integration of pulses prior to their being outputted to output 11.

If the lens or antenna 1 diameter D, then the smallest angle between two objects 5 scene 3 is given approximately by $$\phi = \lambda/D \tag{1}$$

where D is the diameter of lens or antenna 1 and $\lambda$ is the wavelength. The angle $\theta$ 7 of course forms beam 2 and subtends the distance L at range q. Equation (1) defines the theoretical limit of resolution in a lens or antenna 1 limited by diffraction, when objects 5 being resolved are stationary with respect to the lens.

In practice, the photoelements in imager 4 will restrict the resolution to a value larger than the minimum of equation (1), in general $$\phi_p = \theta/N \tag{2}$$

which results from the fact that each photoelement of the N-element imager 4 responds to a smaller fraction of the whole angle $\theta$ 7, by a fraction 1/N. The restriction by photoelements is due to their size so that as the state-of-art of photoelements decreases their size, the number of photoelements N in imager 4 will increase and thereby permitting practical equation (2) to approach the theoretical limit of equation (1). However, the resolution of the prior art given by equation (2) can be obtained only when objects 5 in object scene 3 are stationary or at best near-stationary since to be detected the image must dwell for a sufficient amount of time in each photocell of imager 4. Thus, while the prior art using imager 4 has the potential to obtain measurements it is restricted to near-stationary motions of objects 5 at best.

In a non-cooperative system, object 5 is any one of a natural or man-made object of interest, while in a cooperative system, object 5 may assume the role of a tag attached, built into or imprinted upon an object of interest such as a vehicle, container, box, carton, postal mail, stock certificate, etc., which may be stationary or moving in the direction x at speed v. Object 5 reflects or radiates coherently or incoherently as a monochromatic, narrowband or broadband source. In some applications, object 5 may reflect a harmonic or subcarrier frequency of its illumination.

It is desired that clock 6 output the charges in photoelements of imager 4 due to objects 5 in the view scene 3. This can be accomplished in one of a number of ways, for example clock 6 may be programmed manually or electrically by means 6a to sweep or scan photoelements periodically, i.e., in a search or scanning mode. Each frame of the periodic scan is made available at output 11 and a pulse 51 indicates the instant, i.e., for that frame, position of object 5 appearing in the frame. If object 5 is stationary, its pulse 51 is stationary while if object 5 moves its pulse 51 moves in the sequence of frames. In other words, in the search mode, a stationary object 5 produces an imager appearing in the same photoelement in imager 4 on each scan by clock 6 while a moving object 5 produces an image appearing in different photoelements in imager 4 in the sequence of scans by clodk 6. The search mode results can be viewed by providing a viewing means 63 at the output 11 of imager 4. Or, clock 6 may be programmed to track a target 5, for example the output 11 representing the coordinates of target 5 may be inputted to a data processor 63 operating as a servo 64 or feedback means for outputting a feedback signal FB through electrical means 6a to clock for adjusting its signal to track the photoelement detecting object 5, i.e., in the track mode. For example, processor 63 may include logic means to compute the angles of pulses 51 corresponding to objects 5 on a frame-by-frame basis, to compute changes and from these changes to generate error signals which can then be provided to means 6a as feedback signal FB. Or, clock 6 may be programmed to scan photoelements periodically and stopping occasionally at the photoelement detecting object 5, i.e., in a track-while-scan mode. Clock means 6 therefore may include mechanical or electrical means including servo or feedback connections from data processor 63 for adjusting its timing waveform, i.e., to apply the appropriate waveform from clock 6 to imager 4 and thereby to obtain the desired mode of operation. Whichever its mode of control, clock 6 generates the appropriate timing signal which shifts the charges of photoelements to the output 11 of imager 4 and which allows for implementing the search, track and track-while-scan modes of operation. Pulses 51 appear at the output of imager 4 which correspond one-for-one with objects 5. Each such pulse is the result of accumulation of detected charges in one or more photoelements of imager 4 due to a single object 5.

It will be appreciated that the system of the invention permits the detection of changes of coordinates of object 5 and this fact is the basis for implementing tracking, motion compensation, and the speed measurements of objects. For example, if object 5 is stationary then each frame of data, i.e., each scanning of photoelements by the clock 6 waveform, appearing at the output 11 of imager 4 will indicate the same angle measurement of object 5. Now, if object 5 moves in the direction x with speed v then each frame of data at output 11 will indicate a change in the angular measurement of object 5. Thus, in the scanning mode moving object 5 will be detected by noting the change of angular measurement indicted by pulse 51 at output 11 of imager 4. Data frames at output 11 can be inputted to data processor 63 to compute the change, for example in a matched filter or correlator, and for providing an error signal to clock 6 through electrical means 6a. In turn, the error signal can be used in a number of ways, for example to change the frame rate of clock 6. The term frame is used herein to indicate the number of photoelements K being sampled by clock 6 in a given period of time $T_f$. The frame rate is given by $F=1/T_f$. The number of photoelements K in a frame can be any number from 1 to N, the maximum number of photoelements. Thus, in the tracking mode clock 6 produces a waveform which addresses K photoelement detecting objects 5.

The implementing of motion compensation is not unlike the implementing of a tracking mode. The difference being that unlike a tracking mode which utilizes the error signal from data processor 63 to change the signal applied by clock 6 to imager 4 and thereby to enable the tracking of the pulse 51 from object 5, motion compensation utilizes the error signal from data processor 63 to realign the lens 1 centerline 9 and thusly to restore the detection of object 5 by the same photoelement of imager 4. Motion compensation therefore requires the error signal from data processor 63 to be applied to the structural combination of lens 1 and imager 4 to enable the redirection of centerline 9, for example in a missile which utilizes the invention. Successful motion compensation results in pulses 51 corresponding to ojbects 5 appearing stationary in the sequence of frames. In other words, in motion compensation, a stationary or moving object 5 produces an image which appears in the same photoelement of imager 4 over a sequence of frames, i.e., readouts of photoelements at output 11 of imager 4.

The implementing of speed measurement is made by the angular and range coordinates of object 5 at successive positions of its path and then computing a geometrical solution for the speed v in data processor 63. The angular measurement is made using the system of the invention while the range measurement is made using a conventional ranging means, for example by including a radar, lidar, etc. as part of the invention system. By way of example, let object 5 travel from position element 1 to position elemet n in object scene 3 in a measured time period t. The distance d travelled by object 5 is found using the well known trigonometric formula $d^2 = q_1^2 + q_n^2 - 2q_1q_2 \cos(\theta_1 - \theta_n)$ in which $q_1$, $q_2$ are the range measurements from the center of lens 1 and $\theta_1$, $\theta_n$ are the angular measurements from centerline 9. The speed of object 5 is therefore $v = d/t$ and is a vector directed from coordinate $(q_1, \theta_1)$ to coordinate $(q_n, \theta_n)$.

Clock means 6 shifts photoelements of imager 4 at the synchronizing frequency F given by $$F = Nv/L \quad (3)$$

which is valid for the geometry of FIGS. 1, 2, and 3. Clearly then, for a fixed number of photoelements N and speed v of object 5, the frequency F is dependent upon the distance L spanning object scene 3, i.e., since L itself depends on the range q, F depends on the range between lens 1 and object scene 3. This means that objects at ranges other than range q will be defocused and their signals will not be optimally processed in imager 4 and data processor 63. Clock means 6, therefore, may include manual or electrical means 6a for adjusting frequency F to the desired range q, i.e., clock 6 includes variable means for changing the range focus of objects. For example, the error signal from data processor 63 may be used as input to electrical means 6a for adjusting frequency F.

As just described, object 5 moves in the direction x with velocity v relative to lens or antenna 1. The relative velocity v is obtained through object 5 motion, lens or antenna 1 motion, or combination of both motions. As stated previously, pulses 51 appear at the output 11 of imager 4 which correspond one-for-one with objects 5 and these appear as long as object 5 stays in beam 2. Each such pulse is the result of an integration of individual charges in photoelements of imager 4 due to object 5.

Image sensor 4 can be arranged to form an area image sensor 60, as shown in FIG. 5, and thereby to provide high resolution in the y-direction—perpendicular to the x-direction—as well. FIG. 5 shows M images 6L–6M each being identical to the linear imager 4 of FIG. 1 and as seen in a top view, i.e., facing the object scene 3 from above. Clock 6 is connected to each of the imagers 6L–6M. The system of FIG. 5 operates in a parallel mode in which optical data from M objects 5 at locations L–M in the y-direction of object scene 3, corresponding to photoelements 1 of imagers 6L–6M, is read into the area imager 60 in parallel and then is shifted in parallel through the N photoelements of imagers 6L–6M so that area sensor 60 provides M outputs in parallel instead of the single output of linear image sensor 4 in FIGS. 1, 2 and 3. In some applications, an M-bit shift register 61 may be provided so that each parallel transfer appearing at the output of area image sensor 60 may be read out as an M-bit line of data at the output 62 of readout shift register 61. Shift register 61 is controlled by clock 6 and operates at a rate M-times that of imagers 6L–6M. Thus, the data output from image sensor 60 can be read out in parallel directly from the output of area imager 60 or can be read out in series from the output 62 of readout shift register 61. In either case, the data can be viewed in a suitable display such as TV display in 65 or can be further processed in a suitable data processor such as a matched filter, correlator, convolver, etc. in 63. It should be understood that although imagers 6L–6M have been indicated as being shifted by clock 6 to provide the serial readout of data to the output of imager 60 they may be shifted to provide the random address outputting of data to the output of imager 60. Also, while M outputs have been indicated for imager 60 one for each imager 6L–6M, eachimager 6L–6M may have N outputs one for each photoelement, i.e., each imager 6L–6M for providing N outputs.

It will be appreciated from the foregoing description of the apparatus and its operation that the invention provides an uncomplicated apparatus for measuring angles and speeds of objects and for tracking and motion compensation of objects using an image scanner. The apparatus comprises a focusing lens or antenna 1 for forming a receiving beam 2 of acoustical or electromagnetic energy, an image sensor 4 for detecting signals from objects 5 through the lens 1 and a clock 6 for shifting the contents of image sensor 4 to its output 11. An object 5 in the receiving beam 2 is detected by one or more photoelements of the image sensor 4. The clock 6 shifts the detected charges in photoelements of the image sensor 4 to its output 11. The image sensor 4 acts, therefore, as a recorder or detector of objects 5 in view scene 3. The output 11 of image sensor 4 represents the instant detections of objects 5 by the individual photoelements and appears as a frame of pulses with a pulse 51 appearing for each object 5. The output 11 of image sensor 4 can be used in a data processor 63 for measuring angles and speeds of objects, for detecting and correlating desired images, for generating error signals used for implementing the scanning, tracking, and track-while-scan modes and motion compensation features of the invention, and can also be used in an output display 63 for viewing and recording images of the object scene 3. In some applications a coherent or incoherent transmitter 8 for illuminating objects 5 and/or a stable local oscillator 8, 33 for operating the system as a coherent system are provided, i.e., for referencing signals being detected by image sensor 4. In other applications the apparatus may be provided with a variable clock means 6 for changing timing signals of its operation used to implement scanning, tracking, track-while-scan, and motion compensation features of the invention. In this manner, the system of the invention measures the angles and speeds of targets and provides scanning, tracking, track-while-scan, and motion compensation features in real time of monochromatic, narrowband or broadband signals from objects 5 and having small size, weight, power consumption and cost as compared to the prior art devices and having non-blurring images using image sensors and, therefore, extending the range of application for such devices.

Without lens or antenna 1, the invention provides an uncomplicated apparatus for recording and reproducing holograms using image scanners.

Turning now to a description of the method of the invention, the method comprises the steps of focusing an object scene 3 through a lens or antenna 1 onto an image sensor 4; detecting signals from objects 5 in object scene 3 in the image sensor 4; and shifting the image sensor 4 to obtain outputs at 11 representing the angular and range positions of objects 5. The method can be modified by including the step of illuminating objects 5 with a coherent or incoherent transmitter 8. The method can be further modified by including the step of generating a stable local frequency for referencing signals being detected by image sensor 4. The method can be further modified by including the step of operating the system at one of an acoustical, microwave or optical frequencies. The method can also be modified by including the step of varying the shifting of the image sensor 4 by timing signals from clock 6 to obtain the scanning, tracking, track-while-scan, and motion compensation features of the invention.

Without lens or antenna 1, the invention provides an uncomplicated method for the recording and reproducing of holograms using image scanners.

It will be appreciated that imager 4 permits the detection of both the signal amplitude and phase and this fact is the basis for implementing a real time holographic system. The preservation of signal phase enables the use of imager 4 to replace the film of conventional holography. Thus, if one illuminates imager 4 directly, i.e., without lens 1, with a reference beam to establish the phase reference and simultaneously illuminates imager 4 indirectly with a signal beam in the manner of conventional holography then each photoelement receives the linear combination of the reference and signal beams and will record the signal beam amplitude and phase at its location. Thus, a complete image of object scene 3 can be recorded in imager 4. And, clock 6 can be used to read out the imager 4 contents to output 11. The method of operating imager 4 as a holographic device is equally simple and comprises the steps of illuminating imager 4 with a reference beam 20 to establish the phase reference, illuminating the imager 4 simultaneously with a signal beam (defined by the angle subtended by object 5 to the imager 4 and without lens 1) to record the amplitude and phase of the information, and then shifting the contents of imager 4 to its output 11.

Up to this point the operation of imager 4, in the holographic implementation of the invention, has been described for recording electronic signals for each object 5 in object scene 3 where the electronic signal represents the recorded hologram of its object 5. Once the electronic contents of imager 4 have been provided to its output 11 these may be stored, for example on a magnetic tape or in an electronic memory, for future use. To reproduce the recorded hologram the stored electronic signal may be inputted to an optical processing device (transducer) such as a bulk wave acousto-optic diffraction cell or surface acoustic wave light modulator which also receives as input a second reference beam. The transducer provides as output a modulated light beam which is the reproduced signal beam and which represents the reproduced image of its object 5. The reproduced image may be viewed directly or through a viewing means.

To the extent that the system is implemented to operate in one dimension x it can serve in applications for bearing and speed measurements; object 5 bearing is obtained by using each pulse 51 in a data processor 63 to determine the angle of object 5 from lens 1 centerline 9; object 5 speed is objected by using pulses 51 in a data processor 63 to determine ranges and bearings of object 5 and then using a trigonometric solution to obtain the vector speed. To the extent to which the system is implemented with area imager 60 to operate in two dimensions x, y, it can serve in applications such as the scanning, tracking, track-whilescan, and motion compensation modes, for example used in surveillance, reconnaissance, ground mapping, and missile systems.

Without lens 1, area imager 60 may be used to implement real time holography. Thus, the system of the invention provides apparatus and method for both focal plane and imaging holographic systems.

From the foregoing it will be appreciated that, in addition to the uncomplicated apparatus, the invention also provides an uncomplicated method for measuring angles and speeds of objects and for holographic real time imaging using image scanners. The apparatus requires few wires or electrical connections for implementing the combination of a lens 1 and imager 4 and thus contrasting with the large requirement for same in the prior art. As a consequence, a very small size, weight, power consumption and cost of apparatus is required to implement the devices of the invention over the prior art systems having the same measurement and resolving capabilities. Clearly, the optical and microwave embodiments of FIGS. 1, 2 and 3 of the invention require but minimal power for operating imager 4 and clock 6 and the usual amounts of power for operating the more conventional parts of the system. Yet the signal and data capacity of the present invention approaches that of an optical processor. This is by virtue of the fact that photoelements in imager 4 have high packing densities and thereby permitting approaching the diffraction limit of equation (1). In general, therefore, the system of the invention produces these results at a fraction of the conventional size, weight, power consumption and cost while implementing the use of image scanners to many important applications. If the efficiency of a system is defined as the inverse product of its size, weight, power consumption and cost, the overall efficiency of the present invention over the prior art is superior for applications at comparable sensing, resolving, and motion levels. From this brief comparison of the improved efficiency of the invention over the prior art apparatus and methods, it will be appreciated that the invention is suitable for use where prior art systems were unsuitable. For example, the high resolution which has been demonstrated by image scanners in imaging applications can now be extended to applications involving the measurement of angles and speeds, the scanning, tracking, track-while-scan, motion compensation modes of control and in real time holographic imaging applications. But even more significantly, the invention extends the use of image sensors to the commercial sector in such applications as bearing, angle, and speed measurements, object tracking, motion compensation, and holographic imaging, and in all such applications where small size, weight, power consumption and cost of high resolution measurements are required.

It will finally be appreciated by those skilled in the art that various modifications can be made within the scope of the invention. For example, the invention can be operated at any one of an acoustic (low or high frequency sound) or electromagnetic (radio, microwave, millimeter, infra-red, optical, ultraviolet frequencies. Thus, if the illumination is X-rays, a conventional X-ray-to-light image converter or scintillator can be inserted between the object and the lens and thusly to implement a medical scanner. For example see the article by W. Hyzer "Trends in High Speed Photography" appearing at page 36 of the October 1976 issue of Research/Development magazine and reporting work on X-ray image converters prior to the filing date of the parent to this application. And, a variety of image sensors 4, 60 are available for implementing the invention, i.e., for implementing the combination of imager 4, 60 and clock 6 to obtain an image scanner. And, amplitude and phase tapering and range compensation lenses can be included between lens 1 and imager 4, 60 to weight signals appearing at the face of imager 4, 60 or to compensate for slant range. And, cyrogenic cooling can be used to increase the detectivity of photoelements. And a variety of clock means 6 and synchronizing frequency rates F are available to implement the invention. In particular, clock means 6 may include addressing means for addressing photoelements in imager 4, 60, for example when operating imager 4, 60 in a random address readout mode. And, a variety of architectures and technologies are known and these may be used to implement imager 4, 60. And, a variety of well known data processors 63 can be used to carry out the invention, for example angle and speed computers, error computers, matched filters and correlators. And, a variety of well known output display devices 63, for example TV displays, can be used. And diffraction gratings and zone plates may be used in the reference and signal beams to enable operating the system using incoherent sources 8 and thereby producing results as if sources 8 were coherent. Hence, the invention can be practiced otherwise than has been specifically described herein.

I claim:
1. In a system for measuring spatial coordinates, the improvement comprising:
focusing means for acoustical or electromagnetic energy for focusing a receiving beam,
with said receiving beam providing for viewing an object scene;
an image sensor having as input the output of said focusing means for detecting signals from objects in said object scene;
said signals representing one of illuminations or radiations of said objects, said image sensor having a plurality of elements, each element for receiving a substantial portion of the signal from an object at known angular coordinate and providing an electric charge signal in response to an input signal, and including means for shifting a charge signal from an element;

clock means connected to said image sensor for shifting the image sensor contents to its output, said shifting of said clock means providing at the output of said image sensor a pulse for each object in said object scene, with said pulse representing at least the angular coordinate of its object relative to the centerline of said focusing means; and data processor means having as input the output of said image sensor for measuring the angle of objects.

2. The system of claim 1 wherein said image sensor includes a CCD.

3. The system of claim 1 including variable clock means for changing the shifting rate of said image sensor.

4. The system of claim 1 wherein said clock means has an input one of the output of said data processor and the output of said data processor through a variable clock means.

5. The system of claim 1 including motion compensation means having as input the output of said data processor and providing an output to physically realign the centerline of said focusing means to compensate for the motion of objects.

6. The system of claim 1 including output display means having input the output of said image sensor, said output display means providing for viewing and recording images of said object scene.

7. The system of claim 1 wherein said focusing means is a lens.

8. The system of claim 1 wherein said focusing means is an antenna.

9. A method of coordinate measurement comprising the steps of:

focusing an object scene through a focusing unit onto an image sensor having a plurality of elements, each element for receiving a substantial portion of the signal from an object at known angular coordinate and providing an electric charge signal in response to an input signal;

detecting in the image sensor signals from objects in the object scene of said focusing unit;

said signals representing one of illuminations or radiations of said objects;

shifting the image sensor contents to its output, said shifting providing an output pulse for each object in the field of view of said focusing until, said pulse representing at least the angular coordinate of its object relative to the centerline of said focusing unit; and measuring the angle of objects.

10. The method of claim 9 including the step of providing elements as CCDs.

11. The method of claim 9 including the step of varying the shifting rate of said image sensor.

12. The method of claim 9 including the step of using the output of the data processor as a feedback for shifting the image sensor.

13. The method of claim 9 including the step of viewing the output of said image sensor in an output display.

* * * * *